Patented Jan. 15, 1952

2,582,740

UNITED STATES PATENT OFFICE 2,582,740

PHONOGRAPH RECORD COMPOSITION COMPRISING VINYL RESIN AND BUTADIENE-ACRYLONITRILE COPOLYMER

Joseph W. Ayers, Easton, Pa., assignor to Agrashell, Inc., a corporation of Delaware No Drawing. Application September 17, 1947, Serial No. 774,684

1 Claim. (Cl. 260—17.4)

This invention relates to vinyl resin molding compositions and molded products producible therefrom. More particularly it relates to vinyl resin base phonograph record molding compositions modified by the presence of novel ingredients which impart substantially improved properties, not only to the composition itself, but also to the sound producing records molded therefrom.

Although vinylite base phonograph records have been known for over fifteen years to possess a number of properties superior to those of shellac base records, such as sound reproducing characteristics, greater strength, toughness and moisture resistance, they have not displaced them to any substantial extent.

Vinylite base record compositions heretofore produced commercially have several objectionable properties. The molding compositions have been lacking in thermoplastic flow characteristics resulting in a long pressing cycle and also in a large proportion of defective molded products.

The principal objects of the present invention are to provide vinyl resin base molding compositions having good thermoplastic flow and to provide phonograph records producible from such compositions which possess greater strength, durability, toughness, resistance to needle wear and superior sound producing qualities.

The record materials constituting the present invention may be defined broadly as molding compositions and molded records containing a vinyl resin molding resin base together with an addition of a nitrile synthetic rubber compatible with the vinyl resin used. The rubber-like compound serves the dual function of plasticizing the molding composition and of reinforcing the resin in the records produced from the composition.

Particularly satisfactory results have been obtained through the employment of butadiene-acrylonitrile polymers generally referred to as Buna-N. Butadiene polymerized with acrylonitrile within a range of proportions between about 20% and 40% may be employed. For the production of phonograph records of highest quality, it is essential that the elastomer be employed in limited amounts or not more than about 20%. Surprisingly, when the proportion of the rubber compound is increased to an amount above this figure in relation to the weight of the vinyl resin, the surface noise characteristics increase to a degree rendering the records unacceptable for commercial use. In preferred filled compositions the optimum amount is about 10%. The minimum amount utilizable is not critical, for any small percentage imparts improved properties.

Although the mixture of the vinyl resin base with the nitrile rubber may be employed without any further addition in the production of records having superior qualities, it is advisable to improve and reduce the cost of the compositions by incorporating an antioxidant for the rubber compound and a stabilizing agent for the vinyl resin, and by incorporating fillers and small quantities of coloring agents and plasticizing agents.

The present invention contemplates the employment of any phonograph record vinyl resin base, many suitable examples of which are described in the patent and other literature. The preferred vinyl resins are those resulting from the copolymerization of a vinyl halide such as vinyl chloride and an oxygen-containing vinyl compound of which the vinyl ester of aliphatic acids such as vinyl acetate is an example. Mixtures containing about 70% by weight of vinyl halide and 30% or less by weight of the vinyl ester of an aliphatic acid (formic, acetic, propionic and butyric being examples) generally lead to most acceptable results in producing high quality records. Instead of the vinyl chloride-vinyl ester resin base, there may alternatively be employed vinyl acetate, polyvinyl chloride, vinylidene chloride, polyvinyl vinylidene chloride, vinyl butyrate and other like phonograph record resin bases.

A stabilizer is ordinarily employed in the composition in order to prevent the vinyl resin from being decomposed by the action of ultra violet light or elevated temperature. Conventional stabilizing agents such as calcium carbonate, lime, hydrated lime, lead carbonate, lead titanate, and calcium stearate are satisfactory.

Conventional plasticizers may be employed in small amounts, examples of the same being esters of phthalic acid, natural and synthetic glycerides, higher fatty acid esters, hydrogenated vegetable oils, tricresyl phosphate. Chlorinated naphthalene, natural and synthetic waxes and the like may be used as lubricants. As fillers, there may be added alone or in admixture, silicas, silicates, carbonates, metallic oxides, sulphates, feldspars, ligno-cellulose extenders, preferably having at least 45% combined pentosans, hexosans and lignins, and carbon pigments. The following formulas illustrate typical compositions:

Example 1

| | Pounds |
|---|---|
| Vinyl resin base | 40 |
| Butadiene-acrylonitrile polymer (35% acrylonitrile) | 4.5 |
| Hydrated lime | 1 |
| Antioxidant conventional for the vinyl resin base | .045 |
| Plasticizer conventional for the vinyl resin base | 2 |
| Carnauba wax | 1.5 |
| Carbon black | .955 |
| Ligno-cellulose filler | 50 |
| Total | 100 |

Example 2

| | Pounds |
|---|---|
| Vinyl chloride-vinyl acetate copolymer resin (87%:13%) | 49 |
| Butadiene-acrylonitrile polymer (35% acrylonitrile) | 4.5 |
| Hydrated lime | 1 |
| Phenyl-beta-naphthylamine (Age-rite powder) | .01 |
| Dioctyl phthalate | 3 |
| Carnauba wax | .50 |
| Walnut shell flour | 40 |
| Channel carbon black | 1.99 |
| Total | 100 |

In these examples the proportion of added plasticizer is about 5-6%, and the proportion of lignocellulose filler is about 82-125%, based on the weight of the vinyl resin.

As compared with unmodified vinyl base resin compositions, the above compositions containing butadiene-acrylonitrile synthetic rubber having 35% by weight of acrylonitrile possess an improved thermoplastic flow and a shortened pressing cycle, the records molded therefrom having increased form stability, a reduced permanent set and equally long wear resistance, and an improved reproduction quality.

In combining the above described ingredients, solvents are not necessary, for such may be accomplished by merely mixing the ingredients in dry form in conventional manner on differential rolls or in mixers of the Banbury type. The intimately blended mass may be formed into biscuits and subsequently molded under conditions conventional for the particular vinyl resin base employed.

It should be understood that the present invention is not limited to the specific compounds or to the details herein described but that it extends to all equivalents which will occur to those skilled in the art upon consideration of the scope of the claim appended hereto. The percentages set forth in the claim are by weight.

I claim:

A phonograph record molding composition comprising a vinyl chloride-vinyl acetate resin containing at least 70% by weight of the vinyl chloride component, a rubbery butadiene-acrylonitrile copolymer present in an amount of about 10% based on the weight of the vinyl resin, an additional plasticizer for said resin in an amount of about 5 to 6% based on the amount of the vinyl resin and a lignocellulose extender present in an amount of about 82 to 125% by weight of the vinyl resin.

JOSEPH W. AYERS.

REFERENCES CITED

The following references are of record in the file of this patent:

UNITED STATES PATENTS

| Number | Name | Date |
|---|---|---|
| 1,932,889 | Groff | Oct. 21, 1933 |
| 2,217,170 | Hunter | Oct. 8, 1940 |
| 2,307,091 | Yngve | Jan. 5, 1943 |
| 2,330,353 | Henderson | Sept. 28, 1943 |
| 2,439,202 | Daly | Apr. 6, 1948 |
| 2,445,727 | Kinzinger | July 20, 1948 |
| 2,469,721 | Gidley | May 10, 1949 |

OTHER REFERENCES

Kenney, "Modern Plastics," September 1946, pp. 106 and 107.